United States Patent
Rimpl

(10) Patent No.: US 10,004,355 B2
(45) Date of Patent: Jun. 26, 2018

(54) SYSTEM FOR PREPARING MILK AND/OR MILK FOAM IN DRINK MACHINES AND A HEATER UNIT

(71) Applicant: EVERSYS Holding SA, Ardon (CH)

(72) Inventor: Frank Rimpl, Sion (CH)

(73) Assignee: EVERSYS HOLDING SA, Ardon (CH)

( * ) Notice: Subject to any disclaimer, the term of this patent is extended or adjusted under 35 U.S.C. 154(b) by 546 days.

(21) Appl. No.: 14/355,287

(22) PCT Filed: Oct. 27, 2012

(86) PCT No.: PCT/EP2012/004508
§ 371 (c)(1),
(2) Date: Apr. 30, 2014

(87) PCT Pub. No.: WO2013/064232
PCT Pub. Date: May 10, 2013

(65) Prior Publication Data
US 2014/0299001 A1    Oct. 9, 2014

(30) Foreign Application Priority Data

Nov. 1, 2011    (CH) .................................... 1760/11

(51) Int. Cl.
*A47J 31/44*    (2006.01)
(52) U.S. Cl.
CPC .......... *A47J 31/4489* (2013.01); *A47J 31/44* (2013.01); *A47J 31/4485* (2013.01)
(58) Field of Classification Search
CPC ..... A47J 31/4485; A47J 31/4489; A47J 31/44
USPC .................... 99/293, 323.1; 426/596
See application file for complete search history.

(56) References Cited

U.S. PATENT DOCUMENTS

| | | | |
|---|---|---|---|
| 5,738,002 A * | 4/1998 | Marano-Ducarne | A47J 31/4485 261/DIG. 76 |
| 5,862,740 A * | 1/1999 | Grossi | A47J 31/4485 261/DIG. 16 |
| 6,019,032 A | 2/2000 | Arksey | |
| 6,099,878 A | 8/2000 | Arksey | |
| 2003/0106433 A1* | 6/2003 | Oldani | A47J 31/44 99/279 |

(Continued)

FOREIGN PATENT DOCUMENTS

| DE | 38 38 235 | 6/1989 |
|---|---|---|
| DE | 36 50 343 | 3/1996 |

(Continued)

OTHER PUBLICATIONS

International Search Report (ISR) dated Feb. 1, 2013 in International (PCT) Application No. PCT/EP2012/004508.

*Primary Examiner* — Ghassem Alie
*Assistant Examiner* — Nhat Chieu Do
(74) *Attorney, Agent, or Firm* — Wenderoth, Lind & Ponack, L.L.P.

(57) ABSTRACT

A system for preparing milk and milk foam in drink machines, such as coffee machines and similar pieces of equipment, which are provided with a heater unit for heating the milk and/or the milk foam with steam, contains a feed for the milk and/or the milk foam and a separate feed for the steam, which is fed directly, as a heat-transfer medium, into the milk and/or the milk foam in the heater unit, which operates as an injector.

9 Claims, 2 Drawing Sheets

(56) References Cited

U.S. PATENT DOCUMENTS

2007/0243305 A1* 10/2007 Marconi ............. A47J 31/4485
    426/596
2010/0075007 A1   3/2010 Schindler et al.

FOREIGN PATENT DOCUMENTS

| | | | |
|---|---|---|---|
| DE | 44 45 436 | 3/1997 | |
| EP | 0 234 236 | 9/1987 | |
| EP | 0 344 859 | 12/1989 | |
| EP | 0 919 176 | 6/1999 | |
| EP | 1 256 299 | 11/2002 | |
| WO | WO 2005074770 A1 * | 8/2005 | .......... A47J 31/4485 |
| WO | 2008/083941 | 7/2008 | |

* cited by examiner

SYSTEM FOR PREPARING MILK AND/OR MILK FOAM IN DRINK MACHINES AND A HEATER UNIT

BACKGROUND OF THE INVENTION

1. Field of the Invention

The invention relates to a system for preparing milk and/or milk foam in drink machines, such as coffee machines and similar devices, which are provided with a heater unit for heating the milk and/or the milk foam with steam. The invention also relates to the design of the heater unit for the system.

2. Description of Related Art

It is well known for coffee, milk and milk foam drinks as well as mixed drinks, such as, for example, white coffee or cappuccino, to be prepared in devices of this type. In order to heat the milk and/or the milk foam, they are equipped with venturi systems which are generally fitted in the coffee outlet. Examples of such devices are disclosed in publications DE 36 50 343 T2, DE 44 45 436 C2, EP 0234 236 B1 and EP 0 344 859 B1. They are characterized in that interconnection of the delivery and heating of the product takes place here by using the steam as a heating and driving medium at the same time.

It is a disadvantage of these known systems that they have a low heating capacity and/or a poor capability to regulate the product quality and/or the product temperature, and this results in poor or insufficiently consistent quality of the finished end product.

SUMMARY OF THE INVENTION

The object underlying the invention is to avoid these disadvantages and to provide a preparation system of the type specified above which is characterized by a high heating capacity along with simultaneously high regulating capability and minimized thermal system inertia.

This object is achieved according to the invention in that the preparation system is composed of a feed for the milk and/or the milk foam and a separate feed for the steam, the latter being fed directly, as a heat transfer medium, into the milk and/or the milk foam in the heater unit which operates as an injector.

This enables, on the one hand, preparation of the milk foam independently of the heating, the quality of the milk foam thus being able to be regulated independently of the heating operation. The heating based on the principle of steam injection additionally means that the quality of the milk foam remains unimpaired by the heating operation. On the other hand, the separate steam feed ensures that the product is accurately temperature-regulated and the thermal inertia of the preparation system is minimized in order to prevent incrustations from forming during or after the heating phase due to overheated milk.

The feeding of the steam into the milk and/or the milk foam can take place according to the invention either continuously, both the heating medium and the medium to be heated being in a continuous flow, or in a discontinuous process, a portion of the medium to be heated being pumped into the heater unit and then the content of the latter being heated by feeding the heat-transfer medium before the heated liquid is conveyed from the heater unit to the machine outlet by the inflow of the subsequent cold liquid.

Furthermore, the invention makes provision such that the feed for the milk and the milk foam is provided with a delivery pump for conveying the milk and/or the milk foam through the heater unit and on to the machine outlet.

Advantageously, a connectable air feed for preparing the milk foam is located on the intake side of the delivery pump. The amount of milk and/or milk foam fed to the heater unit can be regulated by changing the delivery rate of the pump.

In order to improve the quality of the milk foam, according to the invention an additional hydraulic resistor, preferably in the form of a throttle or a static mixer, can be fitted between the delivery pump and the heater unit or between the latter and the machine outlet. The quality of the milk foam can be set by using regulatable throttles.

According to the invention, the heating of the milk and/or of the milk foam takes place independently of the delivery and production of the milk foam. Due to this, the quality of the foam is independent of the degree of heating. In order to regulate the product temperature, a temperature sensor is fitted on the output side of the heater unit. With the aid of this sensor, it can also be determined whether milk and/or milk foam is still being pumped into the heater unit. If delivery is interrupted, the temperature behind the heater unit then suddenly increases to the temperature of the steam, and the machine signals this to the user with a corresponding signal.

The product temperature can be regulated by changing the delivery speed of the milk and/or the milk foam and/or by changing the flow of steam introduced into the heater unit. With pulsed introduction of the flow of steam, the heating capacity can be regulated by changing the pulse width of the flow of steam. In order to optimize regulation, further temperature sensors can be fitted on the input side of the heater unit in order to measure the milk, milk foam and/or steam temperature.

Furthermore, the invention makes provision such that the heater unit is provided with an inner feed-through channel for the steam and a feed-through channel surrounding the latter coaxially for the milk and/or the milk foam, both feed-through channels being connected to one another by a number of radial channels aligned transversely to the direction of flow. The heater unit works with this design as an injector, and the steam is fed directly through the radial channels into the medium to be heated transversely to the direction of flow. This brings about gentle heating of the medium while largely maintaining the foam quality of the milk foam. In this way, a high heating capacity along with simultaneously high regulating capacity and minimized thermal inertia of the preparation system can also be achieved.

Furthermore, for the purpose of a structurally simple design, it is advantageous if the heater unit according to the invention is composed of two pipe parts passed into one another coaxially and two head parts connected within the latter so as to form a seal, the one head part having connections for the steam inlet and the cold milk and/or cold milk foam inlet, while the other head part is provided with a connection for the hot milk and/or hot milk foam discharge. Advantageously, the connection for the steam inlet is disposed on the face side in the axial direction of the pipe parts. The connections for the cold milk and/or cold milk foam inlet and for the hot milk and/or hot milk foam discharge are on their part disposed to the side, preferably transversely to the axial direction of the pipe parts.

BRIEF DESCRIPTION OF THE DRAWINGS

In the following, the invention is described in more detail by means of an exemplary embodiment with reference to the drawings. These show as follows.

DETAILED DESCRIPTION OF THE INVENTION

Figure 1:
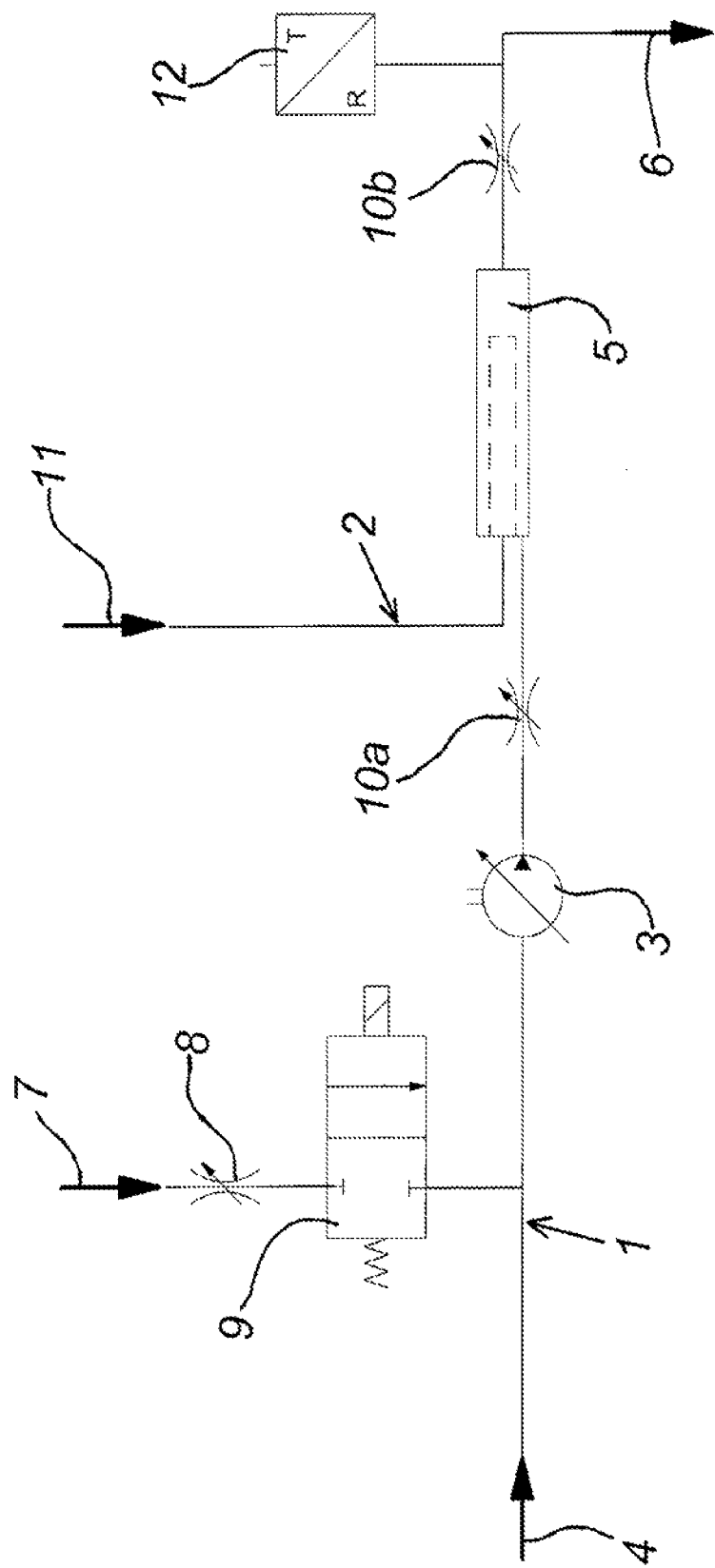
FIG. 1 a hydraulics diagram for the preparation system according to the invention, reduced to the basics, and FIG. 2 a heater unit for the preparation system according to the invention, shown in section.

As can be seen from FIG. 1, the milk and milk foam preparation system consists of a feed 1 for the milk and the milk foam and of a separate feed 2 for the steam as a heat-transfer medium for heating the milk and/or the milk foam.

Located within the feed 1 is a delivery pump 3 for conveying the milk and/or the milk foam from a milk tank 4 to the heater unit 5 and on to the machine outlet 6, and an air feed 7 that can be connected on the intake side of the delivery pump 3 with an air throttle 8 and an air valve 9 for preparing the milk foam.

Fitted between the delivery pump 3 and the heater unit 5 and/or between the latter and the machine outlet 6 is an additional hydraulic resistor in the form of a throttle 10a or 10b. A static mixer may also be fitted instead of the throttle.

The second feed 2 on its part contains a steam inlet 11 to the heater unit 5 and a temperature sensor 12 disposed on the output side of the heater unit 5 for measuring the temperature of the product. Further temperature sensors for measuring the milk and/or milk foam and/or steam temperature may be fitted on the input side of the heater unit 5.

The product temperature can be regulated by measures such as changing the delivery speed of the medium to be heated by means of the delivery pump 3 or by changing the mass flow of the steam introduced, for example, by means of a proportional valve or by changing the pressure in the steam boiler. With pulsed introduction of the flow of steam the heating capacity of the change to the pulse width can be regulated.

Figure 2:
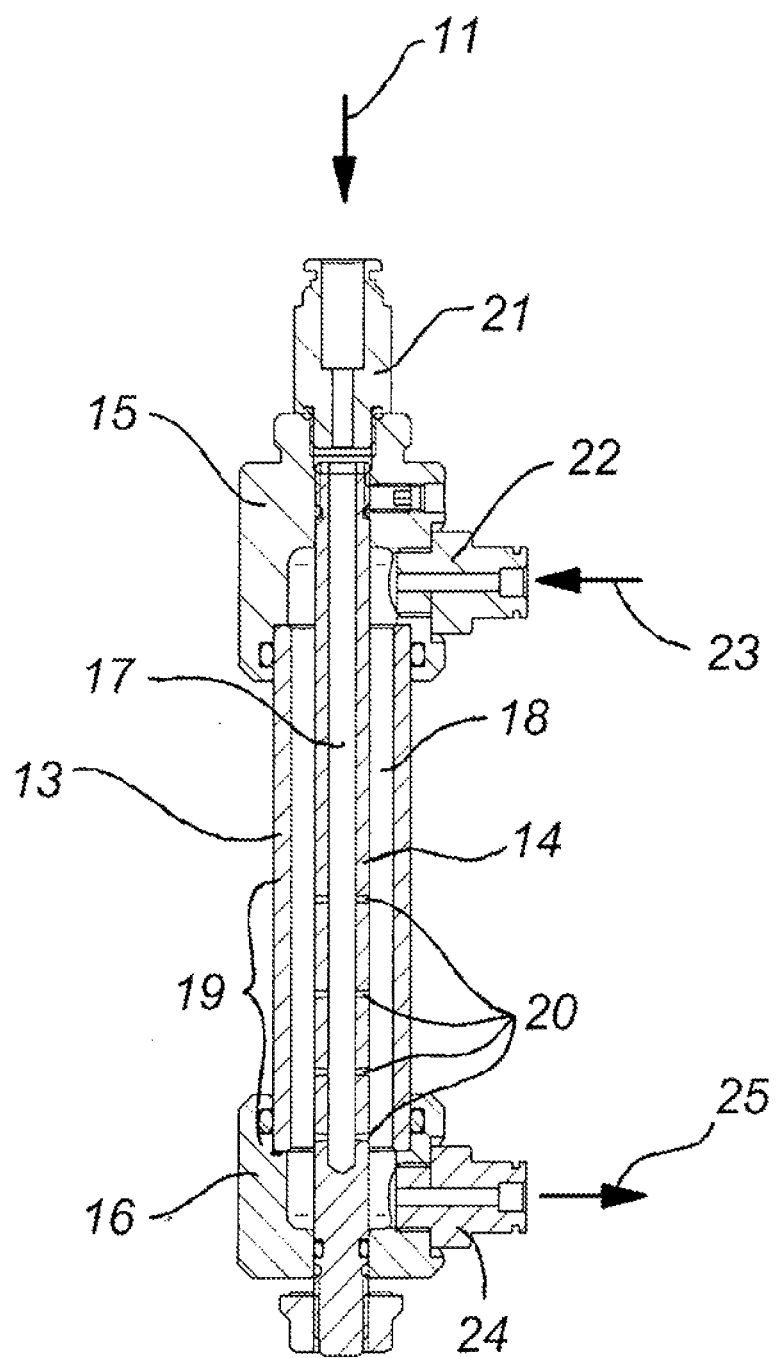

As can be seen from FIG. 2, the heater unit 5 consists of two pipe parts 13, 14 passed into one another coaxially, and two head parts 15, 16 connected to the latter so as to form a seal. The pipe parts 13, 14 form an inner feed-through channel 17 for the steam and a feed-through channel 18 surrounding the latter axially for the milk and/or the milk foam, the two feed-through channels being connected to one another in the output-side section 19 by a number of radial channels 20 aligned transversely to the direction of flow. Disposed in the head part 15 are a connection 21 for the steam inlet 11 aligned in the axial direction of the pipe parts 13, 14 and a connection 22 for the cold milk and/or cold milk foam inlet 23 aligned transversely to the axial direction. The head part 16 on its part is equipped with a connection 24, likewise aligned transversely to the axial direction, for the hot milk and/or hot milk foam discharge 25. This arrangement of the connections facilitates the laying and assembly of the corresponding pipelines.

The arrangement according to the invention of the preparation system with the separate circuits 1 and 2 makes it possible to regulate the milk foaming process independently of the heating process, and this is associated with improved quality of the milk foam product. However, the same also applies conversely, i.e., the arrangement according to the invention also enables precise regulation of the product temperature without having any negative impact upon the quality of the milk foam. As a consequence of a sudden temperature increase, the temperature sensor 12 provided for this purpose can also register whether liquid is being delivered or not. It can thus be determined, e.g., in this way whether the milk container is empty or whether the reservoir for the flushing liquid is emptied when the system is flushed.

The heater unit according to the invention, with its mode of operation as an injector, makes it possible to feed the steam directly into the milk and/or the milk foam. This brings about both a higher heating capacity and a more precise regulating capability of the heating operation, without any negative impact upon the quality of the milk foam. This mode of operation also makes it possible to minimize the thermal inertia in the entire system and so prevent any incrustations due to overheated milk during or after the heating phase.

The preparation system can be provided with additional control means such as, for example, valves for controlling the product flow into different outlets or, for reasons relating to cleaning or product quality, into the discharge. Valves for feeding water into the feed, e.g., during the cleaning operation, or also valves for drawing the liquid in from different tanks, can also be fitted in the system. The system can also be provided with a flow meter for monitoring the product portion size.

The invention claimed is:

1. A heater unit for a system for preparing hot milk or milk foam, the heater unit comprising:
   a first head part,
   a second head part opposite to the first head part,
   an inner channel extending in a longitudinal direction and having a first end which is open and a second end which is closed and opposite to the first end, the first end of the inner channel being connected to a steam feed for feeding steam to the inner channel, and
   an outer annular channel having a first end and a second end, a plurality of radial channels connecting the inner channel and the outer annular channel to one another, each of the plurality of radial channels being aligned transversely with respect to the longitudinal direction,
   wherein the outer annular channel coaxially surrounds the inner channel and the first end of the outer annular channel is connected to a milk feed for feeding cold milk to the outer annular channel and the second end of the outer annular channel is connected to a milk discharge for discharging hot milk or hot milk foam out of the outer annular channel,
   wherein the radial channels are configured to feed steam from the inner channel into the outer annular channel between the first end of the outer annular channel and the second end of the outer annular channel,
   wherein the first head part has a steam connection for feeding steam into the first head part and a milk inlet for feeding cold milk into the first head part,
   wherein the second end of the inner channel extends into the second head part, and
   wherein the second head part has the milk discharge.

2. The heater unit according to claim 1, further comprising:
   a first pipe part and a second pipe part, each of the first pipe part and the second pipe part having a pipe wall, a first end and a second end opposite to the first end, and
   the second pipe part having a smaller diameter than the first pipe part and being arranged coaxially in the first pipe part,
   wherein:
   the pipe wall of the second pipe part surrounds the inner channel and the outer annular channel extends between the pipe wall of the second pipe part and the pipe wall of the first part pipe part, and the first head part is sealingly connected with the first pipe part at the first end thereof and the second pipe part at the first end thereof, and the second head part is sealingly connected with the first pipe part at the second end thereof and the second pipe part at the second end thereof.

3. The heater unit according to claim 2, wherein the milk discharge is located at a lateral side of the second head part.

4. The heater unit according to claim 2, wherein the steam connection is located on a face side of the first head part and the milk inlet is located at a lateral side of the first head part.

5. The heater unit according to claim 4, wherein the milk discharge comprises a discharge line which is oriented transversely to the longitudinal direction.

6. The heater unit according to claim 4, wherein the milk inlet comprises an inlet line which is oriented transversely to the longitudinal direction.

7. The heater unit according to claim 1, wherein:
the radial channels include first radial channels and second radial channels, and
each of the first radial channels is paired with one of the second radial channels such that the first radial channels face the second radial channels, respectively.

8. A heater unit for a system for preparing hot milk or milk foam, the heater unit comprising:
a first head part,
a second head part opposite to the first head part,
a first pipe part and a second pipe part, each of the first pipe part and the second pipe part having a pipe wall, a first end, a second end opposite to the first end, and a common central axis extending in a longitudinal direction,
the pipe wall of the second pipe part surrounding an inner channel and having a smaller diameter than the first pipe part and being arranged coaxially in the first pipe part with the first pipe part and the second pipe part sharing the common central axis,
whereby an outer annular channel extends between the pipe wall of the second pipe part and the pipe wall of the first pipe part with the inner channel and the outer annular channel extending coaxially in the longitudinal direction,
wherein:
the inner channel has an open end which is connected to a steam feed for feeding steam to the inner channel,
the inner channel has a closed end opposite to the open end,
the outer annular channel has a predefined length between the first end of the first pipe part and the second end of the first pipe part, and
a plurality of radial channels is arranged in the pipe wall of the second pipe part, the plurality of radial channels connecting the inner channel and the outer annular channel to one another, and each of the plurality of radial channels being aligned transversely with respect to the longitudinal direction,
the outer annular channel coaxially surrounds the inner channel along all of the predefined length of the outer annular channel, the first end of the first pipe part is connected to a milk feed for feeding cold milk to the outer annular channel and the second end of the first pipe part is connected to a milk discharge for discharging hot milk or hot milk foam out of the outer annular channel,
the closed end of the inner channel extends into the second head part, and the second head part has the milk discharge.

9. The heater unit according to claim 8, wherein:
the radial channels include first radial channels and second radial channels, and each of the first radial channels is paired with one of the second radial channels such that the first radial channels face the second radial channels, respectively.

\* \* \* \* \*